(12) United States Patent
Guduru

(10) Patent No.: US 11,214,499 B2
(45) Date of Patent: Jan. 4, 2022

(54) WATER STERILIZATION CAP WITH REMOVABLE PARTICULATE FILTER AND/OR HYDRATION METER

(71) Applicant: Microlyscs, LLC, Brooklyn, NY (US)

(72) Inventor: Rakesh Guduru, Weston, FL (US)

(73) Assignee: Microlyscs, LLC, Brooklyn, NY (US)

( * ) Notice: Subject to any disclaimer, the term of this patent is extended or adjusted under 35 U.S.C. 154(b) by 42 days.

(21) Appl. No.: 16/874,552

(22) Filed: May 14, 2020

(65) Prior Publication Data
US 2021/0355000 A1 Nov. 18, 2021

(51) Int. Cl.
| | |
|---|---|
| *C02F 1/32* | (2006.01) |
| *C02F 1/00* | (2006.01) |
| *B01D 29/11* | (2006.01) |
| *A45F 3/16* | (2006.01) |
| *B65D 47/06* | (2006.01) |
| *A47G 21/18* | (2006.01) |

(52) U.S. Cl.
CPC ............ *C02F 1/325* (2013.01); *A45F 3/16* (2013.01); *A47G 21/188* (2013.01); *B01D 29/11* (2013.01); *B65D 47/065* (2013.01); *C02F 1/003* (2013.01); *A45F 2003/163* (2013.01); *B01D 2201/4092* (2013.01); *C02F 2201/3222* (2013.01); *C02F 2303/04* (2013.01); *C02F 2307/02* (2013.01)

(58) Field of Classification Search
CPC ...... C02F 1/72; C02F 1/32; C02F 1/30; C02F 1/50; C02F 11/14; B09B 3/00
See application file for complete search history.

(56) References Cited

U.S. PATENT DOCUMENTS

| | | |
|---|---|---|
| 2,139,961 A | 12/1938 | Kleid |
| D153,956 S | 5/1949 | Lay |
| D179,331 S | 11/1956 | Terwilliger |
| D240,716 S | 7/1976 | Hegi |
| D286,027 S | 10/1986 | Waher et al. |
| D292,673 S | 11/1987 | Woodruff et al. |
| D292,674 S | 11/1987 | Morris et al. |
| D310,329 S | 9/1990 | Schmidt |

(Continued)

FOREIGN PATENT DOCUMENTS

| | | |
|---|---|---|
| CN | 3363924 | 4/2004 |
| CN | 201958072 | 9/2011 |

(Continued)

OTHER PUBLICATIONS

Application No. EP20153685, European Search Report, dated Aug. 21, 2020.

(Continued)

*Primary Examiner* — Walter D. Griffin
*Assistant Examiner* — Cameron J Allen
(74) *Attorney, Agent, or Firm* — Frost Brown Todd LLC

(57) ABSTRACT

A water sanitization cap for covering a bottle is provided. The cap may screw-fit on a conventional water bottle. The conventional water bottle may store drinking water. The cap may include a UV-C module. When activated, the UV-C module may destroy bacteria and/or viruses within the water. The cap may also include a particulate filter. The particulate filter may filter out particulate matter from the water when water is being suctioned out of the bottle. The water may be suctioned out of the bottle using a foldaway straw included in the cap.

21 Claims, 15 Drawing Sheets

(56) References Cited

U.S. PATENT DOCUMENTS

| | | | |
|---|---|---|---|
| D359,683 S | 6/1995 | Beach |
| D444,065 S | 6/2001 | Crawford et al. |
| D444,383 S | 7/2001 | Crawford et al. |
| D444,384 S | 7/2001 | Crawford et al. |
| D449,783 S | 10/2001 | Crawford et al. |
| D479,995 S | 9/2003 | Duceppe |
| D481,313 S | 10/2003 | Archer |
| D481,801 S | 11/2003 | Whitley |
| D490,315 S | 5/2004 | Kiser |
| D507,744 S | 7/2005 | Hierzer et al. |
| D516,911 S | 3/2006 | Bloom et al. |
| D518,717 S | 4/2006 | German |
| D519,029 S | 4/2006 | Hicks et al. |
| D522,862 S | 6/2006 | Owens et al. |
| D527,632 S | 9/2006 | Romer |
| D530,611 S | 10/2006 | Nusbaum et al. |
| D531,031 S | 10/2006 | Lussier et al. |
| D534,796 S | 1/2007 | Falkenburg |
| D534,802 S | 1/2007 | German |
| D536,966 S | 2/2007 | Cecere |
| D573,022 S | 7/2008 | Berman |
| D584,151 S | 1/2009 | Murphy |
| D617,427 S | 6/2010 | McNamara |
| D666,908 S | 9/2012 | Dabah et al. |
| D682,102 S | 5/2013 | Davis et al. |
| D692,605 S | 10/2013 | Madonia |
| D707,124 S | 6/2014 | Blain et al. |
| D708,945 S | 7/2014 | Jetmar |
| D717,648 S | 11/2014 | Firestone et al. |
| 8,975,596 B1 | 3/2015 | Matthews et al. |
| D729,063 S | 5/2015 | Koop et al. |
| D730,729 S | 6/2015 | George |
| 9,212,067 B2 | 12/2015 | Gellibolian et al. |
| D760,080 S | 6/2016 | Gorbold |
| D768,489 S | 10/2016 | Indruk |
| D796,326 S | 9/2017 | Ichikawa et al. |
| D804,306 S | 12/2017 | Simons et al. |
| D814,856 S | 4/2018 | Kristinik |
| D818,360 S | 5/2018 | Oates, II et al. |
| D825,334 S | 8/2018 | Ristich |
| D829,550 S | 10/2018 | Brahim et al. |
| D830,799 S | 10/2018 | Najera et al. |
| D850,189 S | 6/2019 | Burton |
| D853,183 S | 7/2019 | Adams, Jr. et al. |
| D858,284 S | 9/2019 | Murac et al. |
| D863,959 S | 10/2019 | Larminaux et al. |
| D866,461 S | 11/2019 | Arimoto et al. |
| D867,880 S | 11/2019 | Sacchetti |
| D871,133 S | 12/2019 | Bullock et al. |
| D875,524 S | 2/2020 | Holmes et al. |
| D878,915 S | 3/2020 | Parzych |
| 10,906,819 B2 * | 2/2021 | Liao .......................... A61L 2/10 |
| 2011/0147335 A1 | 6/2011 | Garcia |
| 2015/0307368 A1 | 10/2015 | Yanke |
| 2020/0079658 A1 | 3/2020 | Weber et al. |

FOREIGN PATENT DOCUMENTS

| | | |
|---|---|---|
| CN | 302727271 | 1/2014 |
| CN | 302968555 | 10/2014 |
| EM | 000070271-0002 | 2/2004 |
| JP | D1354222 | 3/2009 |
| JP | D1470125 | 5/2013 |
| JP | D1470126 | 5/2013 |
| JP | D1502553 | 7/2014 |
| JP | D1512556 | 11/2017 |
| KR | 30-0967435 | 8/2018 |
| KR | 30-0970565 | 8/2018 |
| KR | 30-0996685 | 3/2019 |
| WO | WO2013173953 | 11/2013 |
| WO | WO2014187524 | 11/2014 |

OTHER PUBLICATIONS

"Microlyscs.com," Retrieved from Internet: URL: https://web.archive.org/web/20190224040830/https://microlyscs.com/, Feb. 24, 2019.

Web Packaging. Auto-cleaning replacement cap for water bottles. Feb. 20, 2019. https://www.webpackaging.com/en/portals/microlyscs/assets/12572243/auto-cleaning-replacement-cap-for-water-bottles/ (Year: 2019).

Boring Portal. Crazycap, A UV-Emitting Water Bottle Cap That Purify Water. Feb. 2, 2019. https://boringportal.com/crazycap-water-bottle/ (Year: 2019).

Gadgetify. CrazyCap UV-C Water Purifier Cap. Apr. 27, 2020. https://www.gadgetify.com/crazycap-uv-c-water-punfier-cap/ (Year: 2020).

"How Our Products Work," https://www.lifestraw.com/pages/how-our-products-work LifeStraw Water Filters & Purifiers, Retrieved on Mar. 2, 2020.

"LifeStraw Product Information Presentation," https://www.environfocus.com/lifestraw-nigeria/, Retrieved on Mar. 2, 2020.

"CrazyCap-A Bottle Cap Emits UVC LED Light-Ray to Eliminate Bacteria and Viruses from Your Bottle," http://www.tuvie.com/crazycap-a-bottle-cap-emits-uvc-led-light-ray-to-eliminate-bacteria-and-viruses-from-your-bottle/, Retrieved on Nov. 18, 2019.

"LARQ Bottle," https://www.blessthisstuff.com/stuff/culture/drinks/larq-bottle/, Bless This Stuff, Retrieved on Nov. 18, 2019.

Benjamin Burris, "UV-A Anti Microbe Bottle," https://benburris.myportfolio.com/uv-a-anti-microbe-bottle, Adobe Portfolio, Retrieved on Nov. 18, 2019.

"N-Hug-World's Smartest Self-cleaning Water Bottle," https://www.indiegogo.com/projects/n-hug-world-s-smartest-selfcleaning-water-bottle#/, Indiegogo, Inc., Jun. 3, 2019.

"Liz—The Smartest Self-Cleaning Bottle," https://www.indiegogo.com/projects/liz-the-smartest-self-cleaning-bottle#/, Indiegogo, Inc., Sep. 13, 2019.

"LED and UV Light Filtration Concept," https://www.samastles.com/light-filter, Samantha Astles, Retrieved on Nov. 18, 2019.

Dr. Rakesh Guduru, "CrazyCap-Portable Sterilization System Campaign." https://www.kickstarter.com/projects/1064892678/crazycap-portable-water-sterilization-system, Kickstarter, PBC, Jan. 17, 2019.

Dr. Rakesh Guduru, "CrazyCap-Portable Sterilization System Updates." https://www.kickstarter.com/projects/1064892678/crazycap-portable-water-sterilization-system/posts, Kickstarter, PBC, Jan. 17, 2019.

"Microlyscs Has a Better Alternative to Single-Use Plastic Water Bottles," https://www.newkerala.com/news/read/83249/microlyscs-has-a-better-alternative-to-single-use-plastic-water-bottles.html, Microlyscs LLC, Dec. 27, 2018.

* cited by examiner

WATER STERILIZATION CAP WITH REMOVABLE PARTICULATE FILTER AND/OR HYDRATION METER

FIELD OF TECHNOLOGY

This disclosure relates to water sterilization. Specifically, this disclosure relates to sterilizing water using a combination of ultra violet ("UV") light and other filters.

BACKGROUND OF THE DISCLOSURE

Microorganism-free, pathogen-free, virus-free and bacteria-free water is a necessity for human life. Many times, in various different locations around the globe, clean, bacteria-free water is unavailable because of a variety of reasons.

Traditionally, this problem has been solved by single-use plastic water bottles. However, as a result, plastic waste from single-use plastic water bottles has grown exponentially. The plastic waste generated by disposed-of single-use plastic water bottles has generated a waste-management problem. Additionally, single-use plastic water bottles may be costly, especially in various locations around the globe.

Therefore, it is desirable to provide an apparatus for sterilizing and/or purifying water retrieved from bio-contaminated sources or sources of unknown contamination levels.

It is further desirable for the apparatus to operate together with typical reusable bottles.

It is yet further desirable for the apparatus to operate as a cap for typical reusable bottles.

SUMMARY OF THE DISCLOSURE

Aspects of the disclosure include sanitizing water using both ultraviolet C ("UV-C") rays and a particulate filter. The water may be contained within a conventional reusable bottle. A cap may cover the reusable water bottle.

The cap may include a UV-C module. The UV-C module may shine UV-C rays into the water within the water bottle. The UV-C module may destroy harmful bacteria and viruses within the water.

The cap may also include a filter cage. The filter cage may hold a filter. The filter may be a particulate filter. The particulate filter may filter the water from particulate matter, such as lead, chloride and fluoride. The filter may be disposable. The filter may be specific to a certain particulate matter. For example, one filter may effectively remove lead from the water, while another filter may effectively remove chloride from the water. Yet another filter may be a universal filter that removes a variety of particulate matter.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
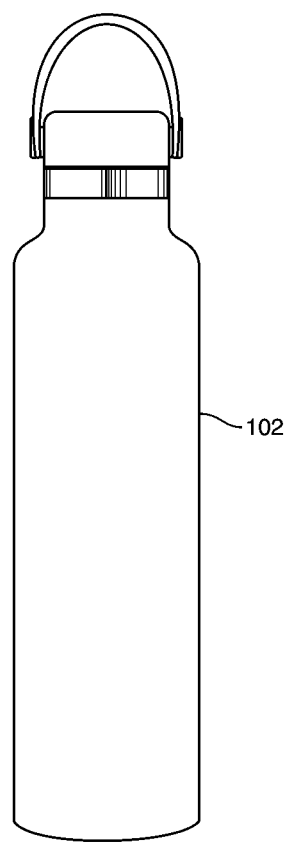
FIG. 1 shows an illustrative front view of a prior art bottle.

A water sanitization cap for covering a bottle is provided. The water sanitization cap may include a barrel. The water sanitization cap may also include a shell. The shell may surround at least a portion of the barrel. The shell may have an outer surface and an inner surface.

The cap may also include a waterproof compartment. The waterproof compartment may be formed within the interior of the barrel. The waterproof compartment may include at least one wall. The at least one wall may be formed at least in part from a transparent material. The transparent material may be quartz crystal.

Quartz crystal may be a material that enables UV-C rays to go through it. Any suitable material that allows passage of UV-C rays may be utilized to form a portion of a wall of the waterproof compartment. Such a material may include a flexible silicone material that enables the penetration of UV-C rays.

The cap may also include a light emitting diode ("LED"). The LED may be fixed within the waterproof compartment. The LED may be proximal to one end of the barrel. The LED may be oriented to shine light through the transparent material.

The light emitted from the LED may be ultraviolet light ranging between 100 and 400 nm. As such, the LED may be an ultraviolet C ("UV-C") LED. A UV-C LED may produce UV-C light, also referred to herein as UV-C rays. UV-C light may be short-wave UV rays in the range of 100-280 nanometers. In some embodiments, the light emitted from the UV-C LED may preferably be about 278 nm.

UV-C rays may penetrate liquids. UV-C rays may penetrate translucent, or partially-translucent liquids. UV-C rays may penetrate microbial cells included in liquids and/or translucent liquids. UV-C rays may destroy the active core (nucleic acids) of the microbial cells. The microbial cells may no longer be viable without the active core. After a period of time, the non-active microbial cells may revert to fundamental constituents, such as carbon dioxide ($CO_2$), and trace elements, such as N (Nitrogen), P (Phosphorus), O (Oxygen) and S (Sulfur).

It should be appreciated that the UV-C rays may be produced, by the LED, without the use of toxic mercury. Toxic mercury may be harmful if ingested.

In some embodiments, the cap may include a safety feature to prevent damage from UV-C rays. The safety feature may guard an unprotected eye or skin which may be damaged by UV-C rays. The safety feature may restrict the UV-C LED from being activated unless the cap is secured onto a bottle. The safety feature may include one, two or more pins included in an inner surface of the shell. The one, two or more pins may restrict the UV-C LED from activating unless the pins are depressed. The pins may not be depressed when the cap is detached from a bottle. The pins may be depressed when the cap is screwed onto, or otherwise secured to a bottle.

The cap may also include a sensor. When activated, the sensor may apply a voltage to the LED to cause the LED to emit light.

In some embodiments, sensor may be a touch sensor. The touch sensor may respond to a single touch, double touch, multi-touch or any other suitable predetermined touch pattern. A single touch may initiate the display of the remaining battery charge.

A double touch may initiate activation of the UV-C LED for a first predetermined period of time. The first predetermined period of time may be 30 seconds, 60 seconds, 90 seconds or any other suitable period of time. Exposure of the contents of the bottle to the UV-C LED rays for the first predetermined period of time may be suitable for destroying microbial cells found in liquids from mildly to moderately contaminated sources. Such mildly to moderately contaminated sources may include unfiltered tap water and water from fountains. Exposure of a UV-C LED to a six to one hundred and twenty eight ounce bottle for the first predetermined time period may sterilize the contents of the bottle to 99.99%.

A multi-touch, such as a three, four, five, six or other suitable amount of touches, may initiate activation of the UV-C LED for a second predetermined period of time. The second predetermined time period may be 90 seconds, 120 second, 150 seconds, 240 seconds, 360 seconds or any other suitable time period. Exposure of the contents of the bottle to the UV-C LED rays for the second predetermined period of time may be suitable for destroying microbial cells found in liquids from moderately to highly contaminated sources. Such moderately to highly contaminated sources may include water from lakes and ponds. Exposure of a UV-C LED to a 6-128-ounce bottle for the second predetermined time period may sterilize the contents of the bottle to 99.9999%.

The cap may also include a filter cage. The filter cage may be operable to contain a filter. It should be appreciated that the filter cage and/or the filter may be replaceable. The filter cage may include a filter cage threaded section.

The water sanitization cap may include a charging site. The charging site may be integral to the shell.

The cap may include a charging site. The charging site may be integral to the shell. As such, a portion of the shell may form the charging site. The charging site may charge a battery located within the cap.

It should be appreciated that the charging site may, in some embodiments, not include a charging port, or at least a readily discernable charging port. Examples of a readily discernable charging port may include a universal serial bus ("USB") port or micro-USB port. For the purposes of this application, port-less may be understood to mean no readily discernable location for the uptake of charging power.

It should be further appreciated that even though the charging site may be port-less, the charging site may utilize a wired connection. In these embodiments, the shell itself may include at least two areas that may conduct electricity. The two areas may be constructed of metal. The first area may be a positive area. The positive area may act a positive charging pole. The second area may be a negative, or ground, area. The negative area may act as a negative charging pole. The positive area and the negative area may be in any suitable shape. An example of a shape may be a ring shape or concentric circle shape. An insulation area may insulate the positive area from the negative area. The insulation area may also be any suitable shape. An example of a suitable shape may be a ring shape. The insulation area may be constructed from an insulating material, such as plastic.

A charger may be used to charge the cap. The charger may be constructed to fit over the shell of the cap. The charger may include a charging terminal. The charging terminal may be built into the inner shell of the charger. The charging terminal may include positive and negative pins. The positive pin may be operable to contact the positive area on the cap. The negative pin may be operable to contact the negative area on the cap. When the charger is fit over the shell, the positive and negative pins may come in contact with the conductive material of the shell of the cap. Once in contact with the positive and negative areas on the cap, the positive and negative pins may charge the battery within the cap. It should be appreciated that the charger may be connected, using a wired connection, or a wireless connection, to a device that provides power. Such a device may include a laptop, electric outlet or any other suitable device.

There may be multiple embodiments for screwing the filter cage into the cap. A first embodiment may include a filter cage threaded section on the filter cage. The filter cage threaded section may be located on the upper outer surface of the filter cage. The filter cage threaded section on the outer upper surface of the filter cage may screw into a shell threaded section on the inner surface of the shell. As such, the filter cage threaded section and the shell threaded section may be complimentary to one another.

A second embodiment may include a filter cage threaded section on the filter cage. The filter cage threaded section may be located on the upper inner surface of the filter cage. The filter cage threaded section on the upper inner surface of the filter cage may screw into a barrel threaded section on an upper outer surface of the barrel. The upper outer surface of barrel may be the surface on the external portion of the barrel on the side that furthest from the UV-C LED. As such, the filter cage threaded section and the barrel threaded section may be complimentary to one another.

In some embodiments, the barrel may be, in whole, or in part, constructed from plastic. When the UV-C rays are emitted from the LED, micro-cracks may form in the portion of the barrel that is exposed to the light. Therefore, a shield, which may be constructed from a metallic material, such as stainless-steel, may protect the portion of the barrel from being exposed to the UV-C rays. In this way, the barrel is not exposed to, and possibly damaged by, the UV-C rays.

As such, the cap may include a shield. The shield may be stainless-steel. The shield may be constructed from any suitable metallic material. The shield may be constructed from any other suitable material. The shield may be operable to shield the barrel from light generated by the LED.

Additionally, at least a portion of the construction of the cap may be a pressure-fit construction—i.e., the components within the cap may be pressure-fit to one another. For example, the shield may be pressure-fit to the barrel and the barrel may be pressure-fit to the shell. The pressure-fitting may be important because the construction may preferably not include glue. Glue may be undesirable because glue may degrade, and, as the glue degrades, it may leach into the water included in the bottle.

A foldaway straw may be constructed as part of the shell. The foldaway straw may be maintained in either an upright state or in a horizontal state. When the foldaway straw is in the horizontal state, the foldaway straw may partially or completely form a plane that is perpendicular to a longitudinal axis of the bottle.

A flow pipe may connect the foldaway straw, in an upright state, to an annular space between the filter cage and the barrel. The flow pipe may directly enable water to pass from the flow pipe into the foldaway straw. The flow pipe may indirectly enable water to pass from the flow pipe into the foldaway straw.

The shell may also include a detent. The detent may store the foldaway straw when the foldaway straw is in the horizontal state. The detent may include a hollow cavity. The sensor may fit into the hollow cavity. The sensor may be accessible when the foldaway straw is in the upright state.

The cap may include one or more other sensors. The one or more other sensors may be operable to measure water depth and/or water temperature. The one or more other sensors may be ultrasonic. The one or more sensors may be built-in probes, such as temperature probes. In some embodiments, the one or more other sensors may constantly remain active. In certain embodiments, the one or more other sensors may determine water data after a predetermined period of time has lapsed. The predetermined period of time may be thirty seconds, one minute, five minutes, thirty minutes or any other suitable time period. In other embodiments, the sensor may determine water data each time the cap is replaced on the bottle. The one or more sensors may be also be known as a hydration meter, as it measures the user's hydration.

Smart logic programming along with sensor calibration may enable the detection of false readings to avoid anomalies. For example, the sensor may determine when the cap is not placed on the bottle. Also, the sensor may determine when the level of the contents is not static, such as during transportation.

The cap may also include a transceiver. The transceiver may transmit and/or receive data from an associated device. The device may be a smartphone, computer, tablet or other suitable device. The transceiver may connect to the device using Bluetooth®, Wi-Fi, or any other suitable communication protocol. The transceiver may transmit water depth, water temperature and/or water sterilization status data to the device. The device may use the received water depth, water temperature and/or water sterilization status data to determine a user's total water consumption.

The device may include an application. The application may receive the water depth, water temperature and/or water sterilization status data. The application may combine the received water depth, water temperature and/or water sterilization status data with timestamp and/or geotagging data determined by the application. The combined data may enable the application to determine water consumption over a period of time, a specific time period and/or a day. The combined data, specifically the geotagging data may help calculate the water consumption when traveling or water consumption at a specific location. The application, based on the data, may instruct a user regarding hydration. Such instruction may include instructing a user to drink more water during specific times during the day and/or at specific locations. Such instruction may display to a user to the difference between water consumption at various geographic locations. For example, such instruction may display to a user the difference between water consumption at home and water consumption at an office location.

In some embodiments, the water sanitization cap may be used to sanitize surfaces, such as a keyboard, mouse, tablet, etc. In such embodiments, the cap may be waved within a predetermined proximity of the surface, e.g., one inch, two inches, three inches of four inches. The waving may be executed for a predetermined amount of time such as one minute or two minutes.

Apparatus described herein are illustrative. Apparatus in accordance with this disclosure will now be described in connection with the figures, which form a part hereof. The figures show illustrative features of apparatus in accordance with the principles of this disclosure. It is to be understood that other embodiments may be utilized and that structural, functional and procedural modifications may be made without departing from the scope and spirit of the present disclosure.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows a front view of a conventional water bottle 102 for use with embodiments of the invention.

Figure 2:
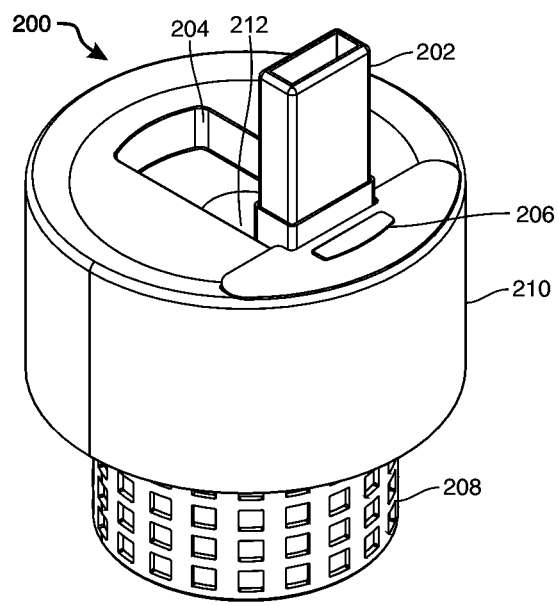
FIG. 2 shows an illustrative top-down perspective view of embodiments of the disclosure.

FIG. 2 shows a top-down perspective view of an exemplary sterilization cap 200 with a removable filter cage (shown partially at 208) according to certain embodiments. Removable filter cage 208 may hold a particulate filter (shown in FIG. 7). Sterilization cap 200 may sterilize water, or any other suitable liquid using both a particulate filter, which filters particles from the water, and a UV-C LED, which destroys microbial cells within the water.

Cap 200 may include foldaway straw 202. Detent 204 preferably illustrates a cavity for foldaway straw 202 when foldaway straw 202 is in an undeployed state.

Detent 204 may include a sensor (shown partially at 212). Sensor 212 may be accessible when foldaway straw 202 in is a deployed stated. Sensor 212 may be a touch sensor. As such, sensor 212 may be sensitive to touch. In response to receipt of a single-touch, double-touch, multi-touch or any other suitable predetermined series of touches, sensor 212 may activate a UV-C LED (not shown) and/or light emitting diode 206.

Cap 200 may include LED 206. LED 206 may illuminate in order to indicate a status of cap 200. LED 206 may illuminate various colors. Each of the colors may indicate a different operational status of cap 200. In addition to the color of the illumination, the frequency of the illumination—e.g., whether the illumination is constant, quick-blinking, slow-blinking, etc.—may indicate various operational statuses of cap 200. Exemplary operational statuses include low, medium and high sterilization status. In addition, a predetermined pattern and/or color of illumination may provide an indication of remaining battery charge.

Cap 200 may include shell 210 and a barrel (not shown). Shell 210 may encapsulate all or a portion of the barrel. The barrel may be obscured from view in FIG. 2 because filter cage 208 may surround the barrel.

Cap 200 may be constructed from metallic materials, glass materials, quartz crystal materials, silicon materials, plastic materials, any other suitable materials or a combination thereof. Most preferably, shell 210 may be constructed at least partially from stainless steel, and the barrel may be constructed at least partially from plastic.

Figure 3:
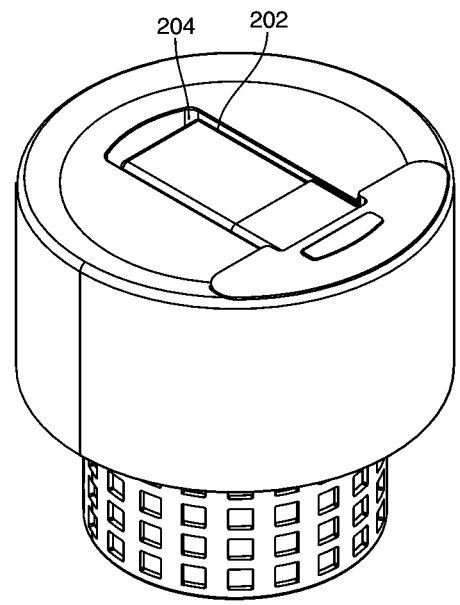
FIG. 3 shows another illustrative top-down perspective view of embodiments of the disclosure.

FIG. 3 shows an illustrative top-down perspective view of an illustrative sterilization cap. In FIG. 3, foldaway straw 202 is shown in an undeployed state. As such, foldaway straw 202 is folded into the cavity formed by detent 204.

Figure 4:
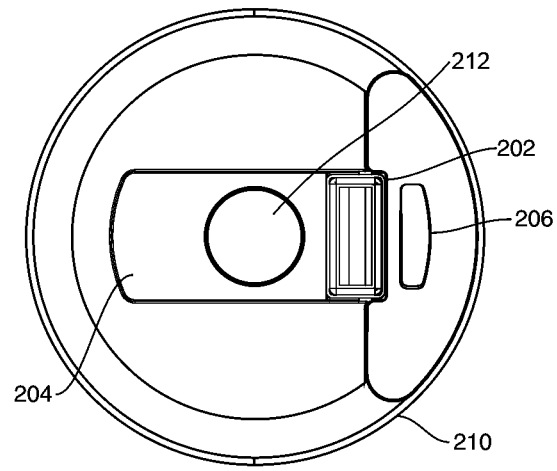
FIG. 4 shows an illustrative top-down view of embodiments of the disclosure.

FIG. 4 shows an illustrative top-down view of an illustrative sterilization cap. In FIG. 4, foldaway straw 202 is shown in a deployed state. As such, sensor 212 is shown within detent 204.

Figure 5:
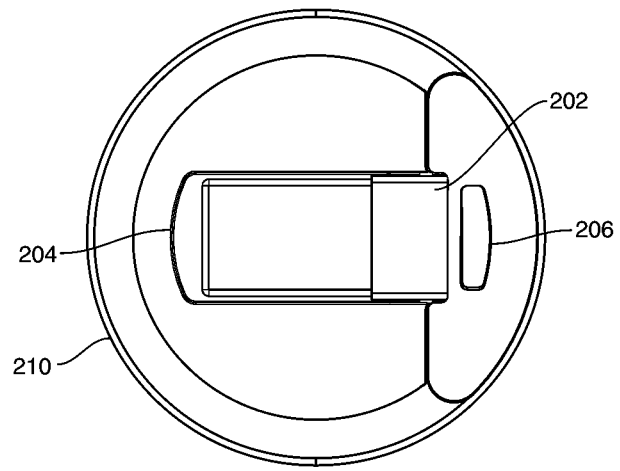
FIG. 5 shows an illustrative top-down view of embodiments of the disclosure.

FIG. 5 shows an illustrative top-down view of an illustrative sterilization cap. In FIG. 5, foldaway straw is shown in an undeployed state. As such, sensor 212 is not visible in FIG. 5.

Figure 6:
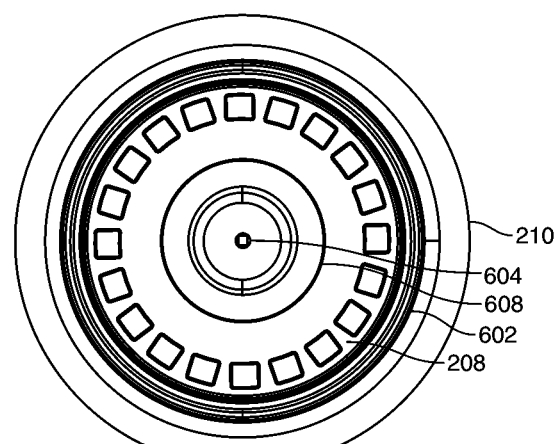
FIG. 6 shows an illustrative bottom-up view of embodiments of the disclosure.

FIG. 6 shows an illustrative bottom-up view of an illustrative sterilization cap. Removable filter cage 208 is screwed into position around barrel 608.

Removable filter cage 208 may be a modular, replaceable filter cage. The modular, replaceable filter cage may hold different filters. Water retrieved from various sources may include different particulates. As such, different filters may be utilized to filter different types of particles, such as lead, chlorine, neuro toxins and/or any other particles. Because the filter cage is preferably both modular and replaceable, one cap may be used to filter water from multiple sources.

There may be multiple embodiments for screwing removable filter cage 208 to the illustrative sterilization cap. A first embodiment may include threads on the outer portion of removable filter cage 208. These threads on the outer portion of removable filter cage 208 may screw into threads on the inner portion of shell 210.

A second embodiment may include threads on the inner portion of removable filter cage 208. These threads on the inner portion of removable filter cage 208 may screw into threads on the outer portion of the barrel.

UV-C LED 604 may be operable to shine UV-C LED rays when activated. UV-C LED 604 may be included in an inner, waterproof compartment of barrel 608.

Figure 7:
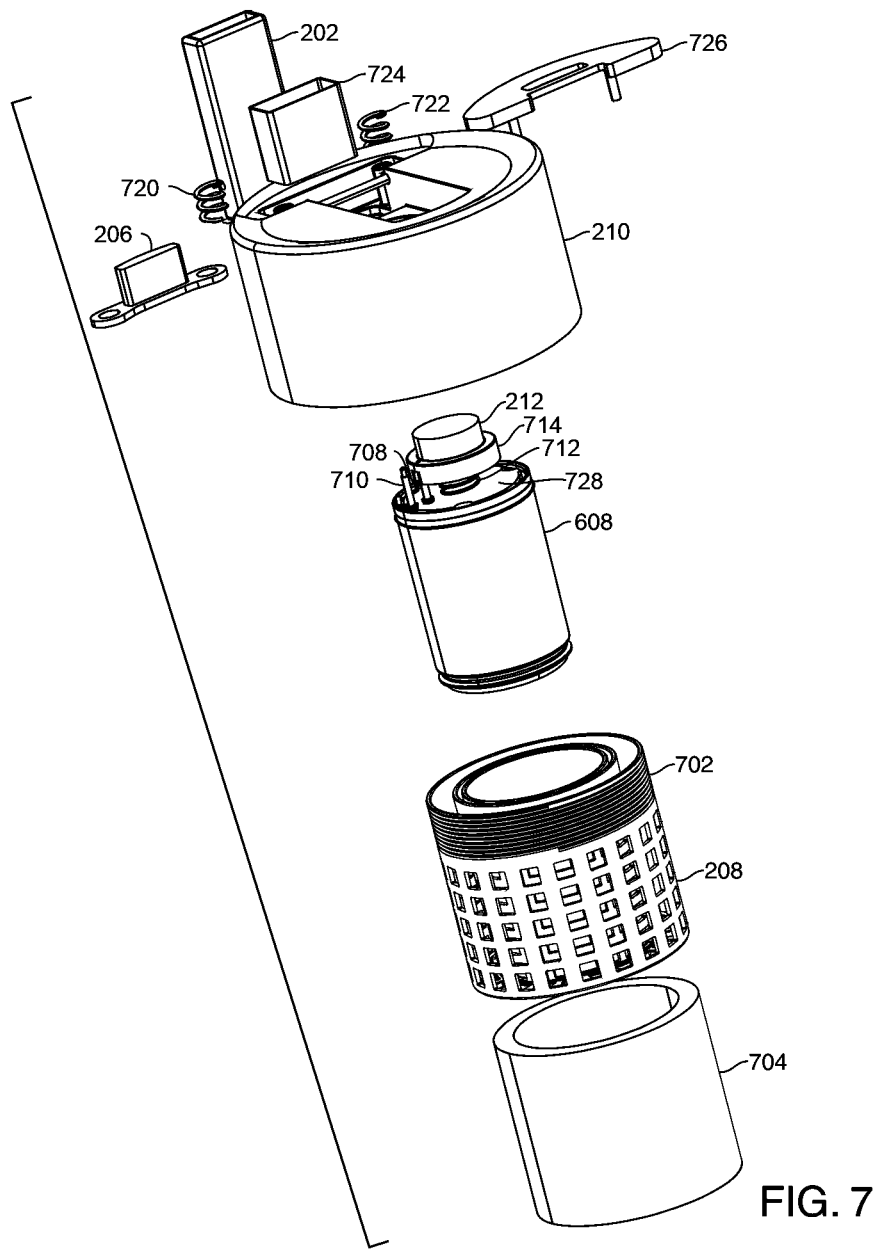
FIG. 7 shows an illustrative exploded view of embodiments of the disclosure.

FIG. 7 shows an exploded view of an illustrative sterilization cap. The exploded view may show the threads on filter cage 208 in accordance with the first embodiment, as described above.

It should be appreciated that at least a portion of the construction of the cap may be a pressure-fit construction—i.e., the components within the cap may be pressure-fit to one another. For example, the shield may be pressure-fit to the barrel and the barrel may be pressure-fit to the shell. The pressure-fitting may be important because the construction may preferably not include glue. Glue may be undesirable because glue may degrade, and as the glue degrades, it may leach into the water included in the bottle.

Filter cage 208 may include outer threads 702. Outer threads 702 may be operable to screw into threads (not shown) on the inner portion of shell 210.

In some embodiments, filter cage 208 may be hollow. Filter cage 208 may house particulate filter 704. In such embodiments, particulate filter 704 may perform the filtration. Particulate filter 704 may be replaceable. Outer threads 702 may enable filter cage 208 to be removed. When filter cage 208 is unscrewed, particulate filter 704 may be removed and replaced with a particulate filter module.

In some embodiments, filter cage 208 and particulate filter 704 may be replaceable. As such, both filter cage 208 and particulate filter 704 may be disposable.

In certain embodiments, filter cage 208 and particulate filter 704 may be coupled to one another. As such, both filter cage 208 and particulate filter 704 may be replaceable and disposable together.

The illustrative sterilization cap may include a charging site. The charging site may be integrated into shell 210. The charging site may include charging pins 708 and 710. Charging pin 708 may be a positive or negative charging pin. Charging pin 708 may preferably be a positive charging pin. Charging pin 708 may form a positive connection with a printed circuit board ("PCB") 728. PCB 728 may be a printed circuit board that mechanically supports and electrically connects electrical or electronic components using conductive tracks, pads and other features etched from one or more sheet layers of copper laminated onto and/or between sheet layers of a nonconductive substrate. Other suitable conducting material may be used.

Charging pin 710 may be a positive or negative charging pin. Charging pin 710 may preferably be a negative charging pin. Charging pin 710 may form a ground connection with PCB 728. Charging pin 710 may also contact the outer portion of shell 210. Charging pin 710 may provide negative contact to the outer portion of shell 210.

Spring 712 may be mounted to PCB 728. Spring 712 may provide the flexibility to sensor 212.

Charging ring 714 may be a positive or negative charging area. Charging ring 714 may preferably be a positive charging area. Charging ring 714 may be constructed from metallic material. Charging ring 714 may contact charging pin 708.

LED 206 may be supported by support 726.

Springs 720 and 722 may enable foldaway straw to be maintained in a deployed position or an undeployed position. Foldaway straw 202 may be supported by straw support 724. When foldaway straw 202 is in an undeployed state, straw support 724 may provide a seal to the flow pipe that enables the water to flow from the bottle into foldaway straw 202.

Figure 8A:
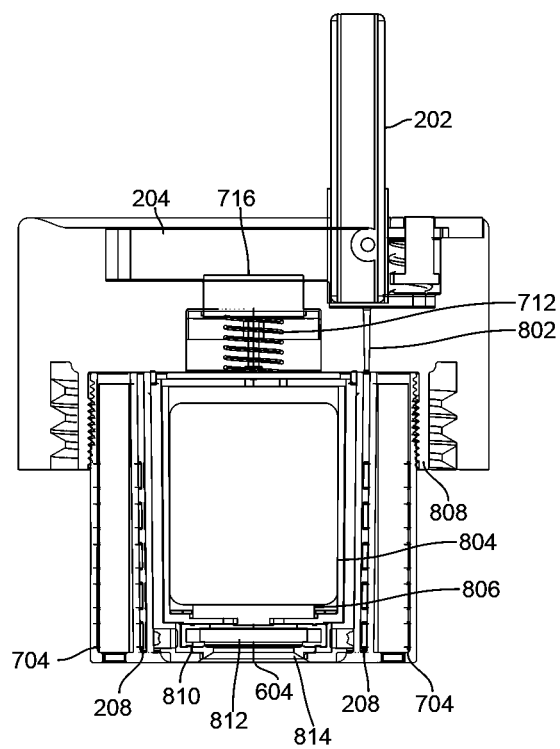
FIGS. 8A and 8B show illustrative cross-sectional views of embodiments of the disclosure.
Figure 8B:
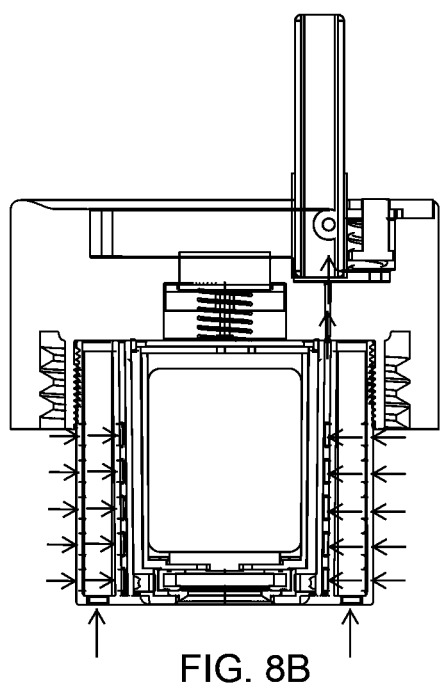

FIGS. 8A and 8B show illustrative cross-sectional views of an illustrative sterilization cap. The cross-sectional views may show the threads on filter cage 208 in accordance with the first embodiment, as described above. FIG. 8A shows illustrative components of the sterilization cap. FIG. 8B includes arrows. The arrows show an illustrative path of water travel through the sterilization cap.

During water consumption through the illustrative sterilization cap, water inside the bottle travels through the bottom and peripheral openings of filter cage 208 and into inner portion of particulate filter 704. The water then travels from particulate filter 704 through the internal openings of filter cage 208 and into the annular space between filter cage 208 and barrel 608. As the water travels through inner portion of particulate filter 704, impurities or contaminants get trapped inside particulate filter 704, leaving the pure water accumulation in the annular space between filter cage 208 and barrel 608.

The pure water travels out through the annular space between filter cage 208 and barrel 608 into flow pipe 802. When foldaway straw 202 is in a deployed state, the water travels from flow pipe 802 into foldaway straw 202.

Upon activation, and prior to water consumption, UV-C LED 604 may be activated. When activated UV-C LED 604 may be used to shine UV-C rays into a conventional reusable water bottle. The UV-C rays may be used to sterilize the contents of the conventional reusable water bottle.

The lower end of barrel 608 may be near UV-C LED 604. Barrel 608 may be primarily constructed from plastic material. It should be appreciated that rays from UV-C LED 604 may create micro-cracks in the lower end of barrel 608. As such, shield 814, which may be constructed from a suitable metallic, such as stainless steel, or other suitable material. Shield 814 may protect lower portion of barrel 608 from exposure to the rays from UV-C LED 604.

The inner compartment of barrel 608 may include various components such as UV-C LED 604, battery 804, PCB-A board 806, O-ring 810, quartz crystal 812, shield 814 and/or other suitable components. Battery 804 may connect, using wires (not shown) to PCB-A board 806. UV-C LED 604 may be mounted on PCB-A board 806. O-ring 810 may surround quartz crystal 812. O-ring 810 may be constructed from silicon material. O-ring 810 may enable the pressure-fit of the illustrative sterilization cap. O-ring 810 may also prevent water from leaking into internal components of the illustrative sterilization cap.

Quartz crystal may be a material that enables UV-C rays to go through it. Any suitable material that allows passage of UV-C rays may be utilized to form a portion of a wall of the waterproof compartment inside the barrel. Such a material may include flexible silicone material that enables the penetration of UV-C rays. As such, quartz crystal 812 may be transparent. Also, quartz crystal 812 may maintain the waterproof properties of the inner compartment of barrel 608. Quartz crystal 812 may enable the UV-C LED rays to shine out from the inner compartment of barrel 608 into a bottle (not shown).

In between filter cage 208 and shell 210 may be a gap, as shown at 808. Gap 808 may enable a bottle to screw into the illustrative sterilization cap.

Figure 9:
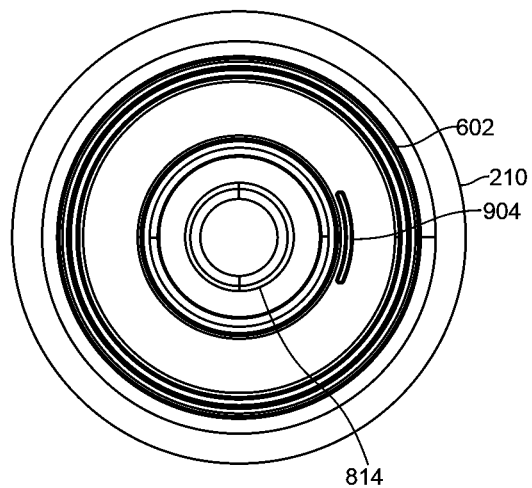
FIG. 9 shows an illustrative bottom-up view of embodiments of the disclosure.

FIG. 9 shows a bottom-up view of an illustrative sterilization cap. The bottom-up view may show threads on filter cage 208 in accordance with the first embodiment, as described above. It should be appreciated that filter cage 208 is not shown in FIG. 9.

The bottom view of the illustrative sterilization cap may show threads 602 on the inner portion of shell 210. Threads 602 may screw into filter cage 208 (not shown). The bottom view of the illustrative sterilization cap may also show UV-C LED 604 and shield 814.

The bottom view of the illustrative sterilization cap may also show bottom opening 904. Bottom opening 904 may be the bottom opening of flow pipe 802 (not shown).

Figure 10:
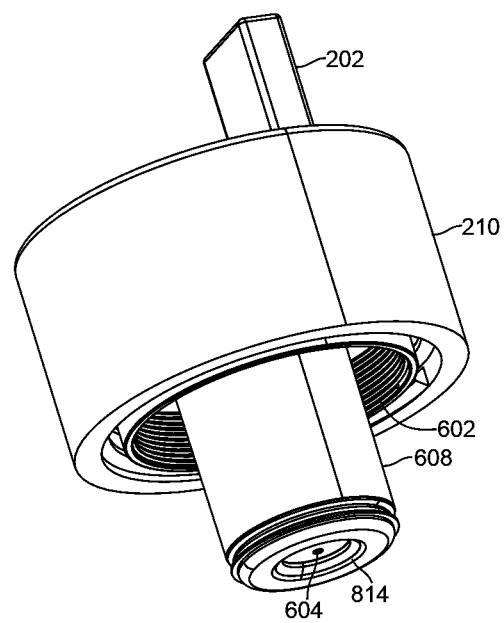
FIG. 10 shows an illustrative bottom-up perspective view of embodiments of the disclosure.

FIG. 10 shows a bottom-up perspective view of an illustrative sterilization cap. The bottom-up perspective view may show threads on filter cage 208 in accordance with the first embodiment, as described above. It should be appreciated that filter cage 208 is not shown in FIG. 10. Threads 602 may screw into filter cage 208 (not shown).

Figure 11:
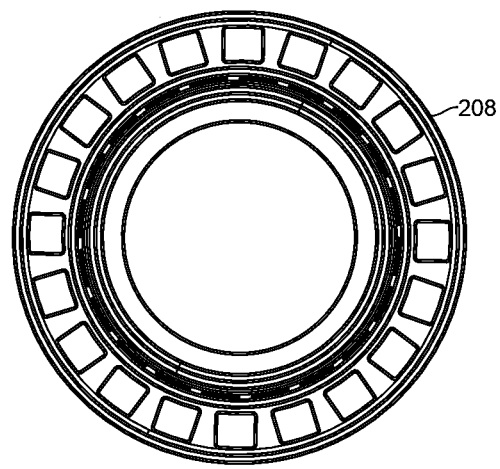
FIG. 11 shows an illustrative bottom-up view of embodiments of the disclosure.

FIG. 11 shows a bottom-up view of filter cage 208.

Figure 12:
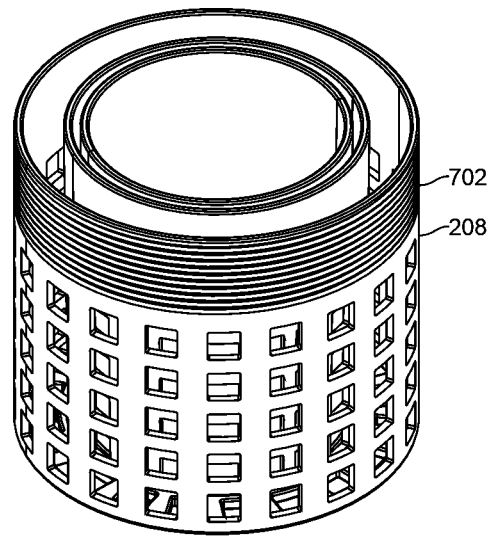
FIG. 12 shows an illustrative top-down perspective view of embodiments of the disclosure.

FIG. 12 shows a top-down perspective view of filter cage 208. The top-down perspective view may show threads on filter cage 208 in accordance with the first embodiment, as described above. Filter cage 208 may hold particulate filter 704 (not shown). Threads 702 are shown on the outer portion of filter cage 208.

Figure 13:
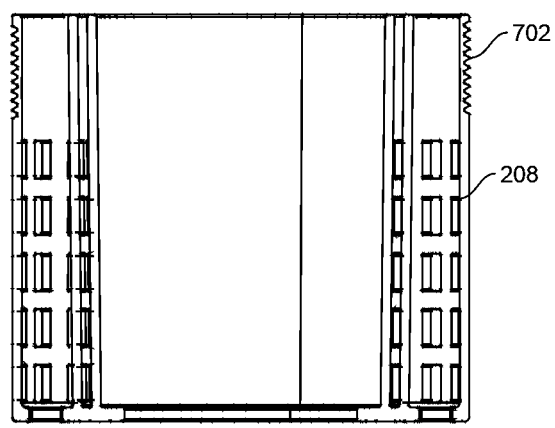
FIG. 13 shows an illustrative cross-sectional view of embodiments of the disclosure.

FIG. 13 shows a cross-sectional view of filter cage 208. The cross-sectional view may show threads on filter cage 208 in accordance with the first embodiment, as described above. Particulate filter 704 (not shown) may fit into filter cage 208. Threads 702 are shown on the outer portion of filter cage 208.

Figure 14:
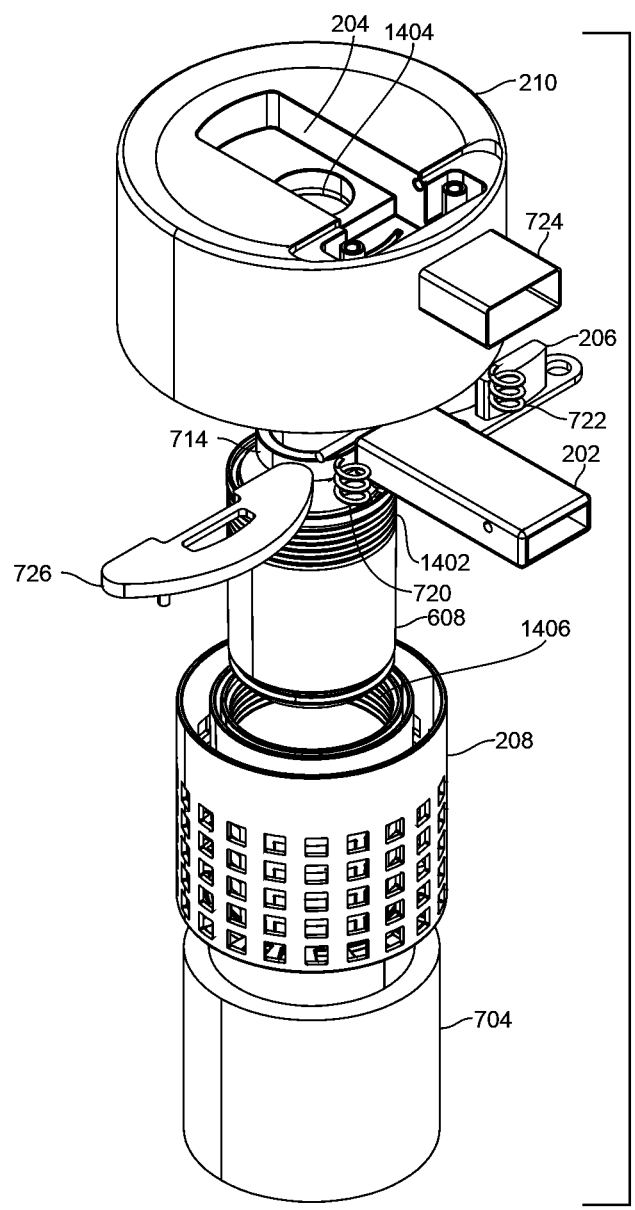
FIG. 14 shows an illustrative exploded view of embodiments of the disclosure.

FIG. 14 shows an exploded view of an illustrative sanitization cap. The exploded view may show the threads on filter cage 208 in accordance with the second embodiment, as described above.

In the second embodiment, barrel 608 may include outer threads, as shown at 1402. Filter cage 208 may include inner threads 1406. Inner threads 1406 may screw into outer threads 1402.

At least a portion of the construction of the cap may be screw-fit construction—i.e., the components within the cap may screw into another component within the cap. For example, the filter cage may screw into the barrel.

At least a portion of the construction of the cap may be a pressure-fit construction—i.e., the components within the cap may be pressure-fit to one another. For example, the shield may be pressure-fit to the barrel and the barrel may be pressure-fit to the shell. The pressure-fitting may be important because the construction may preferably not include glue. Glue may be undesirable because glue may degrade, and as the glue degrades, it may leach into the water included in the bottle.

Circular cavity 1404 may be a cavity within detent 204. The touch sensor (not shown) may fit into circular cavity 1404. Circular cavity 1404 may be accessible when foldaway straw 202 is in a deployed state. As such, when foldaway straw 202 is in an undeployed state, access is blocked to touch sensor (not shown) within circular cavity 104.

Figure 15:
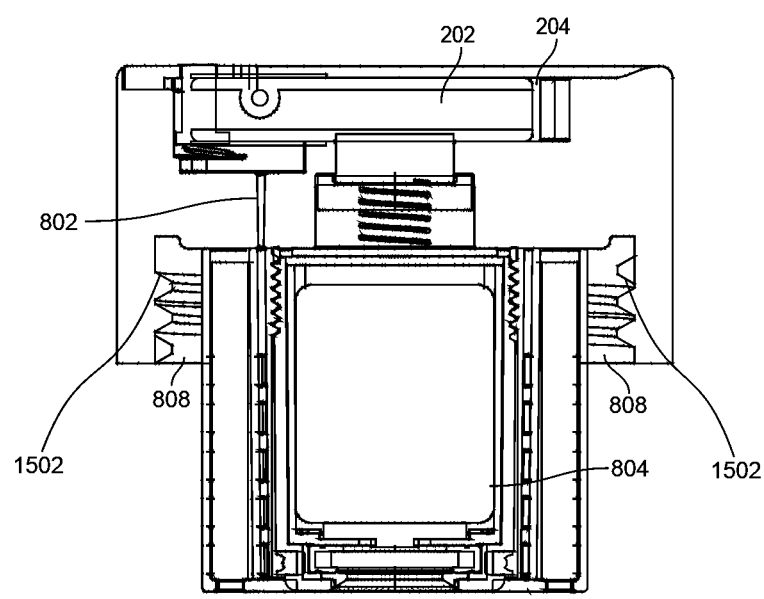
FIG. 15 shows an illustrative cross-sectional view of embodiments of the disclosure.

FIG. 15 shows a cross-sectional view of an illustrative sanitization cap. The cross-sectional view may show the threads on filter cage 208 in accordance with the second embodiment, as described above.

The top of a water bottle (not shown) may have threads. The threads may screw into an illustrative sterilization cap. The threads of the water bottle may screw into threads 1502. Threads 1502 may be located on the inside of shell 210. Gap 808 may enable a bottle to screw into the illustrative sterilization cap.

A gasket (not shown) may be located on the ceiling of threads 1502. The gasket may preferably be circularly shaped. The circular gasket may surround the ceiling of threads 1502. The gasket may be constructed from silicon or any other suitable material. The gasket may seal a bottle to which the illustrative sterilization cap is secured. The gasket may provide a 360-degree seal, or complete seal of the contents of the bottle.

Figure 16:
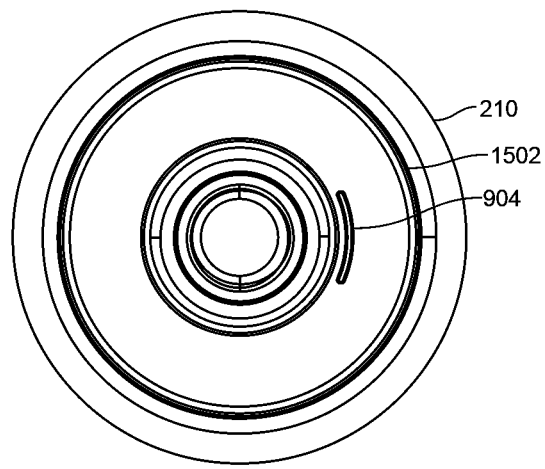
FIG. 16 shows an illustrative bottom-up view of embodiments of the disclosure.

FIG. 16 shows a bottom-up view of an illustrative cap. The bottom-up view may show the threads on filter cage 208 in accordance with the second embodiment, as described above. In FIG. 16, filter cage 208 is not shown.

Figure 17:
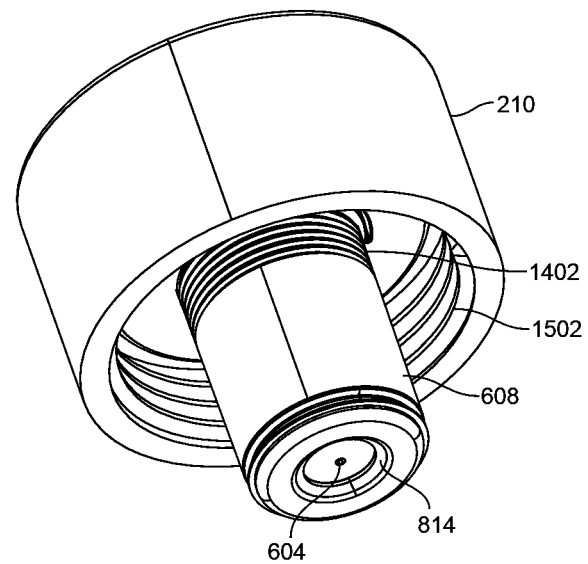
FIG. 17 shows an illustrative bottom-up perspective view of embodiments of the disclosure.

FIG. 17 shows a bottom-up perspective view of an illustrative cap. The bottom-up perspective view may show the threads on filter cage 208 in accordance with the second embodiment, as described above. In FIG. 17, filter cage 208 is not shown.

Figure 18:
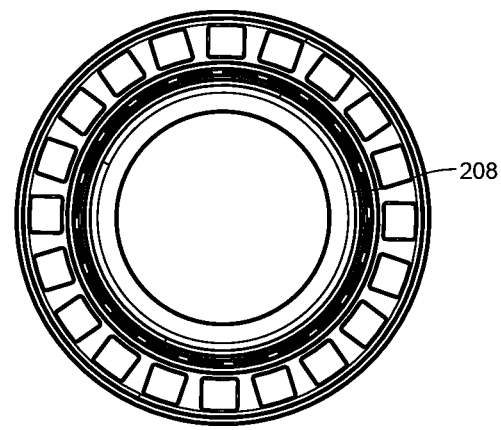
FIG. 18 shows an illustrative bottom-up view of embodiments of the disclosure.

FIG. 18 shows a bottom-up view of an illustrative filter cage. The bottom-up view of the illustrative filter cage may show the threads on filter cage 208 in accordance with the second embodiment, as described above.

Figure 19:
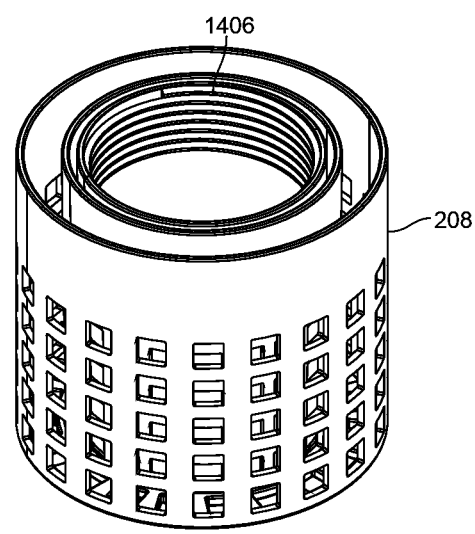
FIG. 19 shows an illustrative top-down view of embodiments of the disclosure.

FIG. 19 shows a top-down perspective view of an illustrative filter cage. The top-down perspective view of the illustrative filter cage may show the threads on filter cage 208 in accordance with the second embodiment, as described above.

Figure 20:
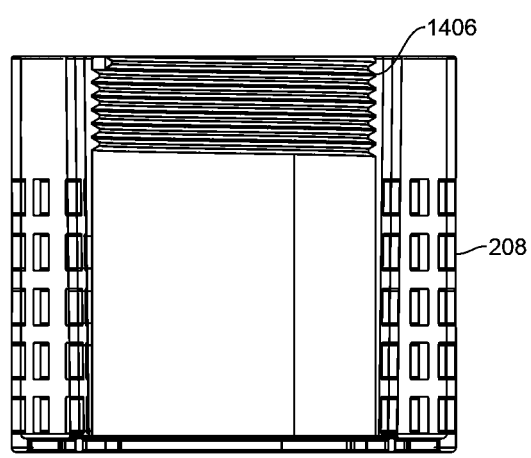
FIG. 20 shows an illustrative cross-sectional view of embodiments of the disclosure.

FIG. 20 shows a cross-sectional view of an illustrative filter cage. The cross-sectional view of the illustrative filter cage may show threads on filter cage 208 in accordance with the second embodiment, as described above.

Thus, a sterilization cap with removable particulate filter and/or hydration meter, is provided. Persons skilled in the art will appreciate that the present invention can be practiced by other than the described embodiments, which are presented for purposes of illustration rather than of limitation. The present invention is limited only by the claims that follow.

What is claimed is:

1. A water sanitization cap for covering a bottle, said cap comprising:
   a barrel;
   a shell, said shell surrounding at least a portion of said barrel, said shell comprising an outer surface and an inner surface, said inner surface comprising a shell threaded section;
   a waterproof compartment formed within the interior of the barrel, said waterproof compartment comprising one wall formed at least in part from a transparent material;
   a light emitting diode ("LED"), said LED:
      fixed within the waterproof compartment;
      proximal to one end of the barrel; and
      oriented to shine light through the transparent material;
   a sensor, said sensor that, when activated, applies a voltage to the LED to cause the LED to emit light; and
   a filter cage operable to contain a filter, said filter cage comprising a filter cage threaded section, said filter cage threaded section for screwing into the shell threaded section.

2. The water sanitization cap of claim 1, further comprising a charging site, said charging site being integral to the shell.

3. The water sanitization cap of claim 1, wherein the transparent material is quartz crystal.

4. The water sanitization cap of claim 1, further comprising a stainless-steel shield, said stainless-steel shield that shields the barrel from light generated by the LED.

5. The water sanitization cap of claim 1, wherein:
   the shell further comprises a foldaway straw; and
   the foldaway straw is maintained in either an upright state or in a horizontal state.

6. The water sanitization cap of claim 5, further comprising a flow pipe, said flow pipe that connects the foldaway straw, in the upright state, to an annular space between the filter cage and the barrel, said flow pipe that indirectly enables water, under suction, to pass from the annular space into the flow pipe, said flow pipe that directly enables water to pass from the flow pipe into the foldaway straw.

7. The water sanitization cap of claim 5, wherein:
   the shell includes a detent for the foldaway straw to be maintained in the horizontal state;
   the detent includes a hollow cavity;
   the sensor fits into the hollow cavity; and
   the sensor is accessible when the foldaway straw is in the upright state.

8. A water sanitization cap for covering a bottle, said cap comprising:
   a barrel, said barrel comprising an outer surface, said outer surface comprising a barrel threaded section;
   a shell, said shell surrounding at least a portion of said barrel;
   a waterproof compartment formed within the interior of the barrel, said waterproof compartment comprising one wall formed at least in part from a transparent material;
   a light emitting diode ("LED"), said LED:
      fixed within the waterproof compartment;
      proximal to one end of the barrel; and
      oriented to shine light through the transparent material;
   a sensor, said sensor that, when activated, applies a voltage to the LED to cause the LED to emit light; and
   a filter cage operable to contain a filter, said filter cage comprising a filter cage threaded section, said filter cage threaded section for screwing into the barrel threaded section.

9. The water sanitization cap of claim 8, further comprising a charging site, said charging site being integral to the shell.

10. The water sanitization cap of claim 8, wherein the transparent material is quartz crystal.

11. The water sanitization cap of claim 8, further comprising a stainless-steel shield, said stainless-steel shield that shields the barrel from light generated by the LED.

12. The water sanitization cap of claim 8, wherein:
   the shell further comprises a foldaway straw; and
   the foldaway straw is maintained in either an upright state or in a horizontal state.

13. The water sanitization cap of claim 12, further comprising a flow pipe, said flow pipe that connects the foldaway straw, in the upright state, to an annular space between the filter cage and the barrel, said flow pipe that indirectly enables water, under suction, to pass from the annular space into the flow pipe, said flow pipe that directly enables water to pass from the flow pipe into the foldaway straw.

14. The water sanitization cap of claim 12, wherein:
   the shell includes a detent for the foldaway straw to be maintained in the horizontal state;
   the detent includes a hollow cavity;
   the sensor fits into the hollow cavity; and
   the sensor is accessible when the foldaway straw is in the upright state.

15. A water sanitization cap for covering a bottle, said cap comprising:
   a barrel;
   a shell, said shell surrounding at least a portion of said barrel, said shell comprising an outer surface and an inner surface, said inner surface comprising a shell threaded section;
   a waterproof compartment formed within the interior of the barrel, said waterproof compartment comprising one wall formed at least in part from a transparent material;
   a light emitting diode ("LED"), said LED:
      fixed within the waterproof compartment;
      proximal to one end of the barrel; and
      oriented to shine light through the transparent material;
   a sensor, said sensor that, when activated, applies a voltage to the LED to cause the LED to emit light; and
   a filter cage operable to contain a filter, said filter cage comprising a filter cage threaded section, said filter cage threaded section for screwing into the shell threaded section on the inner surface of the shell, the filter cage threaded section and the shell threaded section being complimentary to one another.

16. The water sanitization cap of claim 15, wherein the sensor is integrated, using a pressure-fit, into the shell.

17. The water sanitization cap of claim 15, wherein:
the shell further comprises a foldaway straw; and
the foldaway straw is maintained in either an upright state or in a horizontal state, said foldaway straw that, when in said horizontal state, at least partially forms a plane that is perpendicular to a longitudinal axis of the bottle.

18. The water sanitization cap of claim 17, further comprising a flow pipe, said flow pipe that connects the foldaway straw, in the upright state, to an annular space between the filter cage and the barrel, said flow pipe that indirectly enables water, under suction, to pass from the annular space into the flow pipe, said flow pipe that directly enables water to pass from the flow pipe into the foldaway straw.

19. The water sanitization cap of claim 18, wherein:
the shell includes a detent for the foldaway straw to be maintained in the horizontal state;
the detent includes a hollow cavity;
the sensor fits into the hollow cavity; and
the sensor is accessible when the foldaway straw is in the upright state.

20. The water sanitization cap of claim 15, further comprising:
a second sensor, the second sensor that is operable to measure the water depth and/or water temperature of a water bottle attached to the sanitization cap; and
a transceiver, the transceiver that is operable to transmit and/or receive data from an associated device, wherein at least a portion of the transmitted data is the water depth and/or water temperature determined by the second sensor.

21. A method for sanitizing surfaces using a water sanitization cap, the method comprising:
waving, within a predetermined proximity of the surface, the water sanitization cap; and
wherein, the water sanitization cap comprises:
a barrel, said barrel comprising an outer surface, said outer surface comprising a barrel threaded section
a shell, said shell surrounding at least a portion of said barrel;
a waterproof compartment formed within the interior of the barrel, said waterproof compartment comprising one wall formed at least in part from a transparent material;
a light emitting diode ("LED"), said LED:
fixed within the waterproof compartment;
proximal to one end of the barrel; and
oriented to shine light through the transparent material;
a sensor, said sensor that, when activated, applies a voltage to the LED to cause the LED to emit light; and
a filter cage operable to contain a filter, said filter cage comprising a filter cage threaded section, said filter cage threaded section for screwing into the barrel threaded section.

\* \* \* \* \*